(12) United States Patent
Morgan et al.

(10) Patent No.: US 6,937,984 B1
(45) Date of Patent: Aug. 30, 2005

(54) SPEECH COMMAND INPUT RECOGNITION SYSTEM FOR INTERACTIVE COMPUTER DISPLAY WITH SPEECH CONTROLLED DISPLAY OF RECOGNIZED COMMANDS

(75) Inventors: Scott Anthony Morgan, Austin, TX (US); David John Roberts, Stockton (GB); Craig Ardner Swearingen, Austin, TX (US); Alan Richard Tannenbaum, Austin, TX (US)

(73) Assignee: International Business Machines Corporation, New York, NY (US)

( * ) Notice: Subject to any disclaimer, the term of this patent is extended or adjusted under 35 U.S.C. 154(b) by 0 days.

(21) Appl. No.: 09/213,846

(22) Filed: Dec. 17, 1998

(51) Int. Cl.[7] ............................................. G10L 21/00
(52) U.S. Cl. .................................... 704/270; 740/275
(58) Field of Search ................................ 704/270, 275

(56) References Cited

U.S. PATENT DOCUMENTS

| | | | |
|---|---|---|---|
| 4,726,065 A | 2/1988 | Froessl ........................ 381/41 |
| 4,766,529 A | 8/1988 | Nakano et al. .......... 364/513.5 |
| 5,027,406 A * | 6/1991 | Roberts et al. ................ 381/43 |
| 5,068,900 A | 11/1991 | Searcy et al. .................. 381/43 |
| 5,133,011 A | 7/1992 | McKiel, Jr. ................... 381/43 |
| 5,157,384 A | 10/1992 | Greanias et al. ............. 340/706 |
| 5,222,146 A | 6/1993 | Bahl et al. ..................... 381/41 |
| 5,231,670 A * | 7/1993 | Goldhor et al. ............. 704/275 |
| 5,305,244 A | 4/1994 | Newman et al. .......... 364/708.1 |
| 5,386,494 A * | 1/1995 | White ...................... 704/270.1 |
| 5,408,582 A | 4/1995 | Colier ........................ 395/2.52 |
| 5,428,707 A | 6/1995 | Gould et al. ................. 395/2.4 |
| 5,465,317 A | 11/1995 | Epstein ...................... 395/2.45 |
| 5,500,920 A | 3/1996 | Kupiec ...................... 395/2.79 |
| 5,526,407 A | 6/1996 | Russell et al. ................. 379/89 |
| 5,553,121 A | 9/1996 | Martin et al. .................. 379/88 |
| 5,602,963 A | 2/1997 | Bissonnette et al. ........ 395/2.84 |
| 5,604,840 A | 2/1997 | Asai et al. ..................... 395/11 |
| 5,632,002 A | 5/1997 | Hashimoto et al. .......... 395/2.4 |
| 5,638,486 A | 6/1997 | Wang et al. ................ 395/2.45 |
| 5,664,061 A | 9/1997 | Andreshak et al. .......... 704/275 |

(Continued)

*Primary Examiner*—David L. Ometz
*Assistant Examiner*—Michael N Opsasnick
(74) *Attorney, Agent, or Firm*—Mark S. Walker; Jerry B. Kraft

(57) ABSTRACT

The present invention provides a solution for users of voice recognition systems who still need visual feedback in order to confirm the accuracy of spoken commands but need to operate in a "hands-off" mode with respect to computer input. In an interactive computer controlled display system with speech command input recognition, the present invention provides a system for confirming the recognition of a command by first predetermining a plurality of speech commands for respectively designating each of a corresponding plurality of system actions and providing means for detecting such speech commands. There also are means responsive to a detected speech command for displaying said command for a predetermined time period, during which time the user may give a spoken command to stop the system action designated by said displayed command. In the event that said system action is not stopped during said predetermined time period, the system action designated by said displayed command will be executed. The user need not wait for the expiration of the time period if he notes that the displayed command is the right one; he has speech command means for executing the system action designated by said displayed command prior to the expiration of said time period. This may be as simple as just repeating the displayed command.

9 Claims, 5 Drawing Sheets

U.S. PATENT DOCUMENTS

| | | | |
|---|---|---|---|
| 5,671,328 A | 9/1997 | Fitzpatrick et al. | 395/2.55 |
| 5,698,834 A | 12/1997 | Worthington et al. | 235/472 |
| 5,706,399 A | 1/1998 | Bareis | 395/2.83 |
| 5,729,659 A | 3/1998 | Potter | 395/2.79 |
| 5,890,122 A * | 3/1999 | Van Kleeck et al. | 704/275 |
| 6,073,097 A * | 6/2000 | Gould et al. | 704/251 |

* cited by examiner

SPEECH COMMAND INPUT RECOGNITION SYSTEM FOR INTERACTIVE COMPUTER DISPLAY WITH SPEECH CONTROLLED DISPLAY OF RECOGNIZED COMMANDS

CROSS-REFERENCE TO RELATED COPENDING PATENT APPLICATIONS

The following patent applications, which are assigned to the assignee of the present invention and filed concurrently herewith, cover subject matter related to the subject matter of the present invention: "SPEECH COMMAND INPUT RECOGNITION SYSTEM FOR INTERACTIVE COMPUTER DISPLAY WITH MEANS FOR CONCURRENT AND MODELESS DISTINGUISHING BETWEEN SPEECH COMMANDS AND SPEECH QUERIES FOR LOCATING COMMANDS", Scott A. Morgan et al. Ser. No. 09/213,858; "SPEECH COMMAND INPUT RECOGNITION SYSTEM FOR INTERACTIVE COMPUTER DISPLAY WITH TERM WEIGHTING MEANS USED IN INTERPRETING POTENTIAL COMMANDS FROM RELEVANT SPEECH TERMS", Scott A. Morgan et al. Ser. No. 09/213,845; "SPEECH COMMAND INPUT RECOGNITION SYSTEM FOR INTERACTIVE COMPUTER DISPLAY WITH INTERPRETATION OF ANCILLARY RELEVANT SPEECH QUERY TERMS INTO COMMANDS", Scott A. Morgan et al. Ser. No. 09/213,856; and "METHOD AND APPARATUS FOR PRESENTING PROXIMAL FEEDBACK IN VOICE COMMAND SYSTEMS", Alan R. Tannenbaum Ser. No. 09/213,857.

TECHNICAL FIELD

The present invention relates to interactive computer controlled display systems with speech command input and more particularly to such systems which present display feedback to the interactive users.

BACKGROUND OF RELATED ART

The 1990's decade has been marked by a technological revolution driven by the convergence of the data processing industry with the consumer electronics industry. This advance has been even further accelerated by the extensive consumer and business involvement in the Internet over the past few years. As a result of these changes it seems as if virtually all aspects of human endeavor in the industrialized world require human/computer interfaces. There is a need to make computer directed activities accessible to people who, up to a few years ago, were computer illiterate or, at best, computer indifferent.

Thus, there is continuing demand for interfaces to computers and networks which improve the ease of use for the interactive user to access functions and data from the computer. With desktop-like interfaces including windows and icons, as well as three-dimensional virtual reality simulating interfaces, the computer industry has been working hard to fulfill such interface needs by making interfaces more user friendly by making the human/computer interfaces closer and closer to real world interfaces, e.g. human/human interfaces. In such an environment it would be expected that speaking to the computer in natural language would be a very natural way of interfacing with the computer for even novice users. Despite the potential advantages of speech recognition computer interfaces, this technology has been relatively slow in gaining extensive user acceptance.

Speech recognition technology has been available for over twenty years but it has only been recently that it is beginning to find commercial acceptance, particularly with speech dictation or "speech to text" systems, such as those marketed by International Business Machines Corporation (IBM) and Kurzweil Corporation. That aspect of the technology is now expected to have accelerated development until it will have a substantial niche in the word processing market. On the other hand, a more universal application of speech recognition input to computers, which is still behind expectations in user acceptance, is in command and control technology wherein, for example, a user may navigate through a computer system's graphical user interface (GUI) by the user speaking the commands which are customarily found in the systems menu text, icons, labels, buttons, etc.

Many of the deficiencies in speech recognition, both in word processing and in command technologies, are due to inherent voice recognition errors due in part to the status of the technology and in part to the variability of user speech patterns and the user's ability to remember the specific commands necessary to initiate actions. As a result, most current voice recognition systems provide some form of visual feedback which permits the user to confirm that the computer understands his speech utterances. In word processing, such visual feedback is inherent in this process since the purpose of the process is to translate from the spoken to the visual. That may be one of the reasons that the word processing applications of speech recognition have progressed at a faster pace. In any event, in all voice recognition systems with visual feedback, at some stage, the interactive user is required to make some manual input, e.g. through a mouse or a keyboard. The need for such manual operations still gets in the way of interactive users who, because of a lack of computer skills or other reasons, wish to relate to the computer system in a fully voice activated or conversational manner.

SUMMARY OF THE PRESENT INVENTION

The present invention provides a solution for users of voice recognition systems who still need visual feedback in order to confirm the accuracy of spoken commands but need to operate in a "hands-off" mode with respect to computer input. In an interactive computer controlled display system with speech command input recognition, the present invention provides a system for confirming the recognition of a command by first predetermining a plurality of speech commands for respectively designating each of a corresponding plurality of system actions and providing means for detecting such speech commands. There also are means responsive to a detected speech command for displaying said command for a predetermined time period, during which time the user may give a spoken command to stop the system action designated by said displayed command. In the event that said system action is not stopped during said predetermined time period, the system action designated by said displayed command will be executed. The user need not wait for the expiration of the time period if he notes that the displayed command is the right one, he has speech command means for executing the system action designated by said displayed command prior to the expiration of said time period. This may be as simple as just repeating the displayed command.

BRIEF DESCRIPTION OF THE DRAWINGS

The present invention will be better understood and its numerous objects and advantages will become more appar

DETAILED DESCRIPTION OF THE PREFERRED EMBODIMENT

Figure 1:
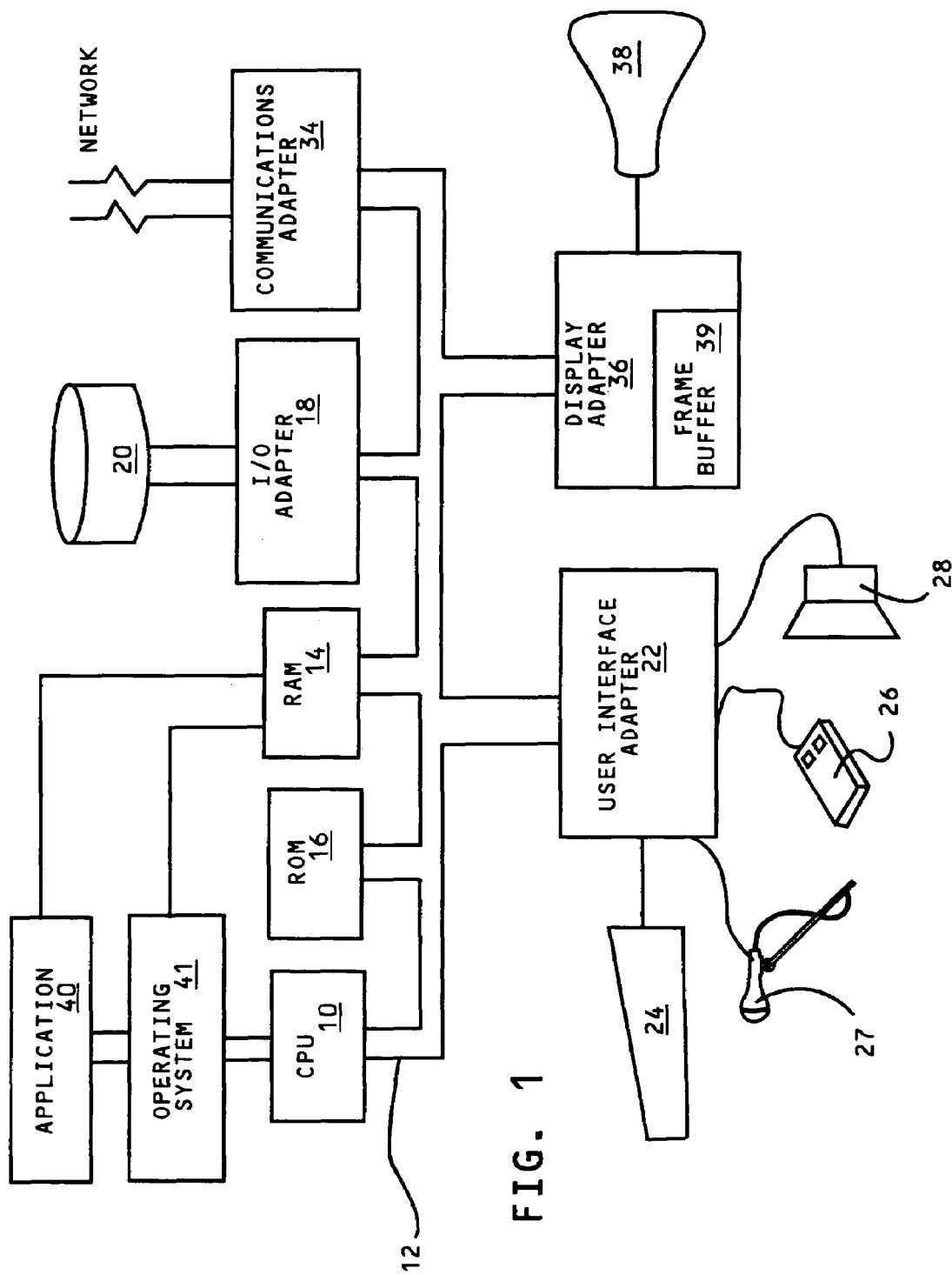
- FIG. 1 is a block diagram of a generalized data processing system including a central processing unit which provides the computer controlled interactive display system with voice input used in practicing the present invention.

Referring to FIG. 1, a typical data processing system is shown which may function as the computer controlled display terminal used in implementing the system of the present invention by receiving and interpreting speech input and providing a displayed feedback of spoken commands and a time period wherein a user may orally stop a command.

A central processing unit (CPU) 10, such as any PC microprocessor in a PC available from IBM or Dell Corp., is provided and interconnected to various other components by system bus 12. An operating system 41 runs on CPU 10, provides control and is used to coordinate the function of the various components of FIG. 1. Operating system 41 may be one of the commercially available operating systems, such as the OS/21™ operating system available from IBM (OS/2 is a trademark of International Business Machines Corporation); Microsoft's Windows 95 ™ or Windows NT™, as well as the UNIX or AIX operating systems. A speech recognition program with visual feedback of spoken commands, so that the user may speak retractions during set time periods, application 40, to be subsequently described in detail, runs in conjunction with operating system 41 and provides output calls to the operating system 41, which implements the various functions to be performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN) or wide area network (WAN), which includes, of course, the Internet. I/O devices are also connected to system bus 12 via user interface adapter 22 and display adapter 36. Keyboard 24 and mouse 26 are all interconnected to bus 12 through user interface adapter 22. Manual I/O devices, such as the keyboard and the mouse, are shown primarily because they may be used for ancillary I/O functions not related to the present invention, which uses primarily spoken commands. Audio output is provided by speaker 28 and the speech input which is made through input device 27, which is diagrammatically depicted as a microphone, which accesses the system through an appropriate interface adapter 22. The speech input and recognition will be subsequently described in greater detail, particularly with respect to FIG. 2. Display adapter 36 includes a frame buffer 39, which is a storage device that holds a representation of each pixel on the display screen 38. Images, such as speech input commands, relevant proposed commands, as well as speech input terminology display feedback panels, may be stored in frame buffer 39 for display on monitor 38 through various components, such as a digital to analog converter (not shown) and the like. By using the aforementioned I/O devices, a user is capable of inputting visual information to the system through the keyboard 24 or mouse 26 in addition to speech input through microphone 27 and receiving output information from the system via display 38 or speaker 28.

Voice or speech input is applied through microphone 27 which represents a speech input device. Since the art of speech terminology and speech command recognition is an old and well developed one, we will not go into the hardware and system details of a typical system which may be used to implement the present invention. It should be clear to those skilled in the art that the systems and hardware in any of the following patents may be used: U.S. Pat. No. 5,671,328; U.S. Pat. No. 5,133,111; U.S. Pat. No. 5,222,146; U.S. Pat. No. 5,664,061; U.S. Pat. No. 5,553,121; and U.S. Pat. No. 5,157,384. The speech input to the system could be actual commands, which the system will recognize, and/or speech terminology, which the user addresses to the computer so that the computer may propose appropriate relevant commands through feedback. The input speech goes through a recognition process which seeks a comparison to a stored set of commands. If a command is identified, the actual command will be displayed first and subsequently carried out after a set time period during which the command may be vocally retracted.

Now with respect to FIGS. 2 through 5 we will provide an illustrative example of how the present invention may be used to provide the visual feedback of displayed commands, as well as the prompts for retracting commands. When the screen image panels are described, it will be understood that these may be rendered by storing image and text creation programs, such as those in any conventional window operating system in the RAM 14 of the system of FIG. 1. The display screens of FIGS. 2 through 7 are presented to the viewer on display monitor 38 of FIG. 1. In accordance with conventional techniques, the user may control the screen interactively through a conventional I/O device, such as mouse 26, FIG. 1, and speech input is applied through microphone 27. These operate through user interface 22 to call upon programs in RAM 14 cooperating with the operating system 41 to create the images in frame buffer 39 of display adapter 36 to control the display panels on monitor 38.

Figure 2:
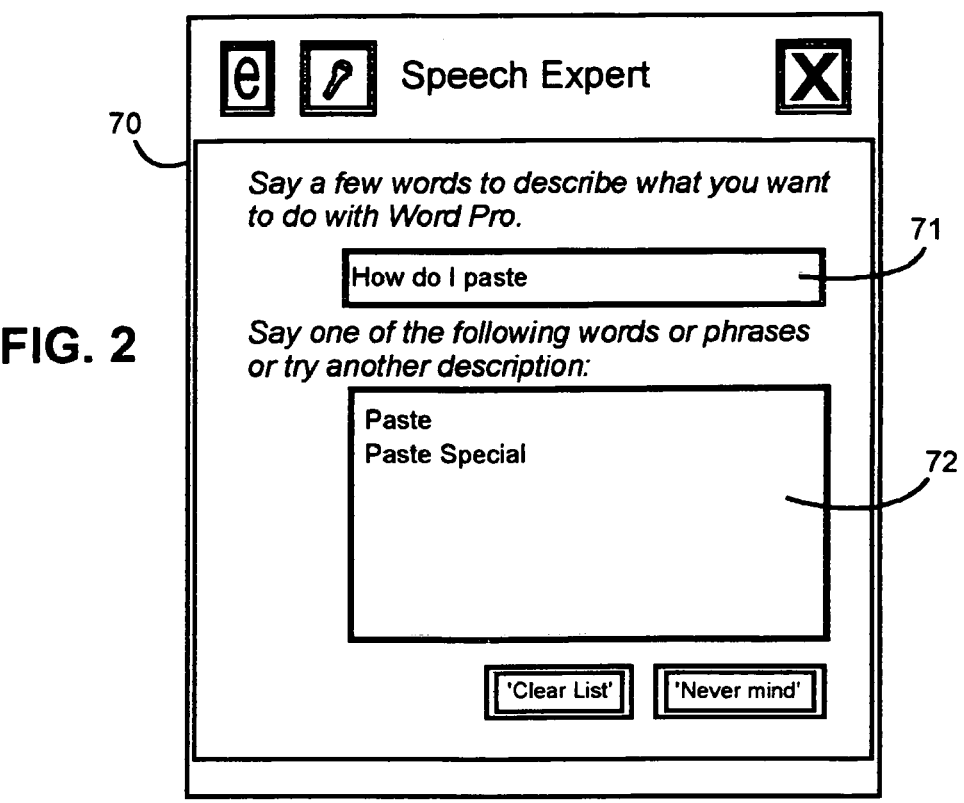
FIG. 2 is a diagrammatic view of a display screen on which an interactive dialog panel interface used for visual feedback when a speech command input has been made.
Figure 3:
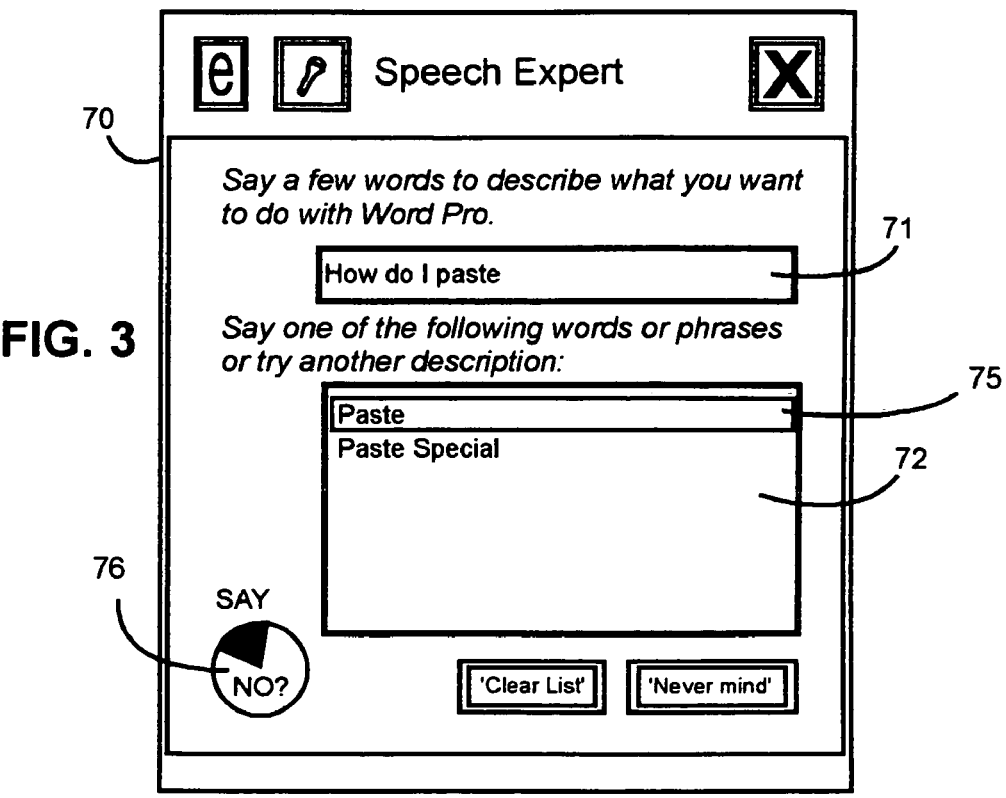
FIG. 3 is the display screen view of FIG. 2 after a speech command input has been made and part of the time period for retracting the command has expired.
Figure 4:
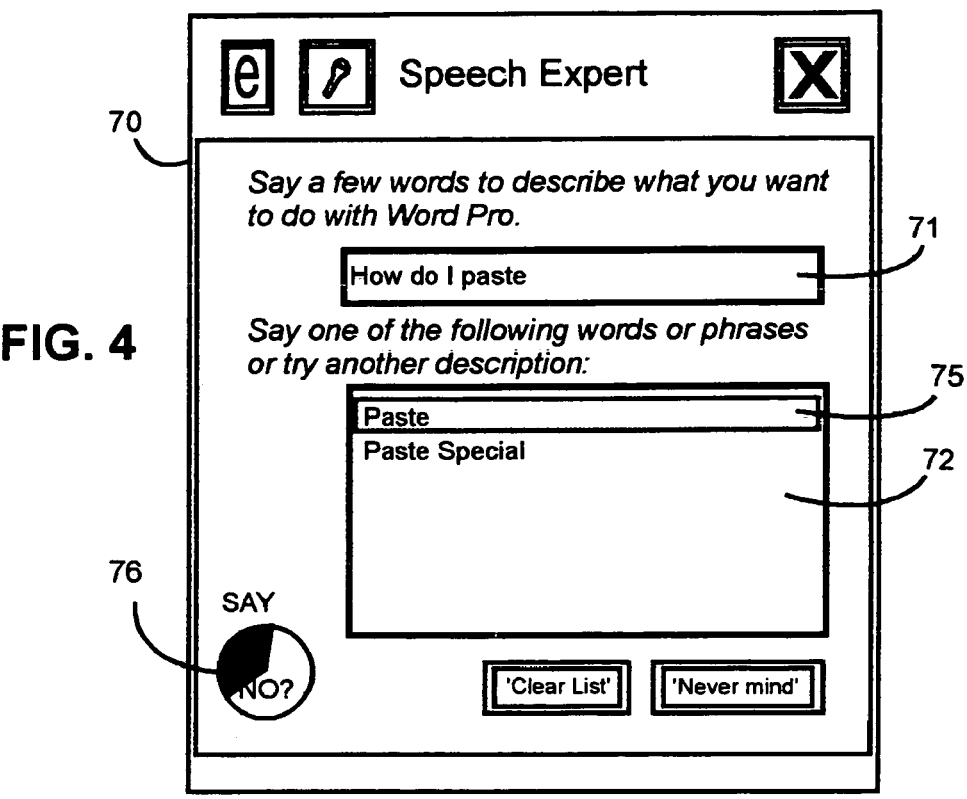
FIG. 4 is the display screen view of FIG. 3 after a further part of the time period for retracting the command has expired.
Figure 5:
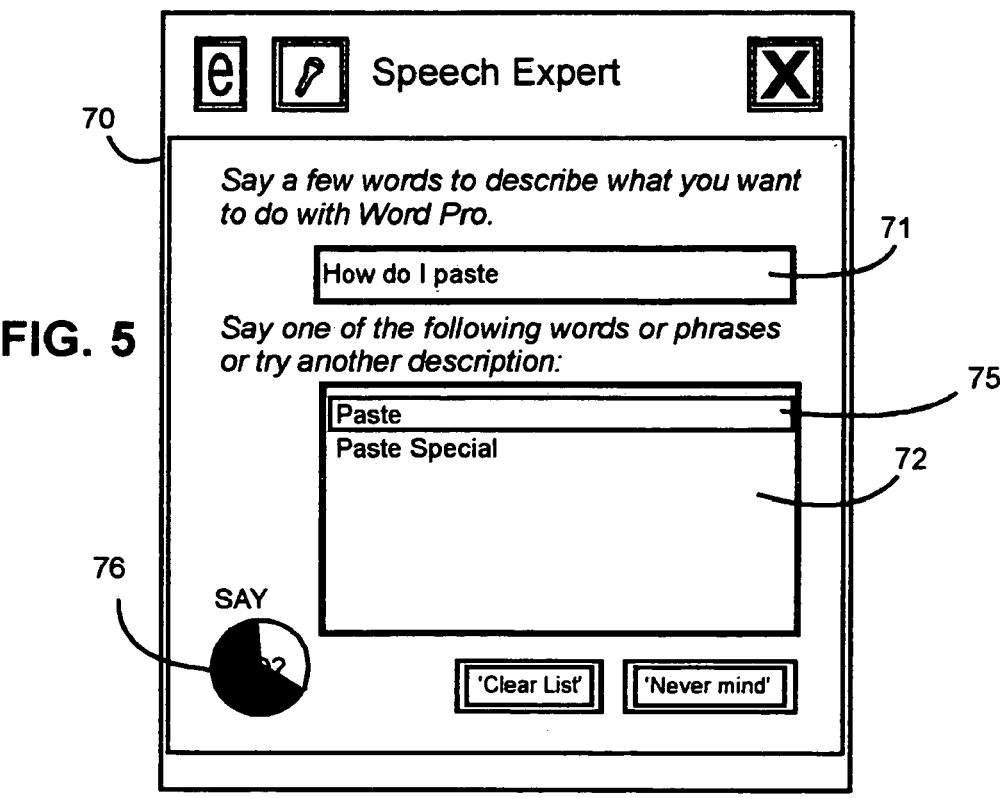
FIG. 5 is the display screen view of FIG. 4 after the time period for retracting the command has almost expired.

The initial display screen of FIG. 2 shows a display screen with visual feedback display panel 70. In the panel, window 71 will show the words that the user speaks; these words may contain commands or may bring forth associated relevant commands; window 72 will display all of the commands. At this point, window 72 is still at a prompt stage suggesting to the user commands which he may wish to use. The user may issue one of these commands by speaking it or he may speak another command. Either way, the result will be the display of the panel of FIG. 3 with the issued command, which, in the present example, is one of the suggested commands, "Paste" being highlighted 75. This commences the run of the time period, as signified by timer icon 76, during which the execution of the selected command is delayed, and the user may stop or retract the command by saying "NO" or a like command for stopping the execution. FIGS. 4 and 5 are the panel of FIG. 3 showing the advance of the time period toward expiration as indicated by timer icon becoming filled up. It should be noted that if the user becomes certain that he has the right command before the time period has expired, he need not wait for the command execution; he may vocally confirm his selection by issuing an appropriate command and have the selected command executed immediately. The system may conveniently be set up so that all he has to do is repeat his selected command, e.g. "Paste", and the command will be executed immediately.

Figure 6:
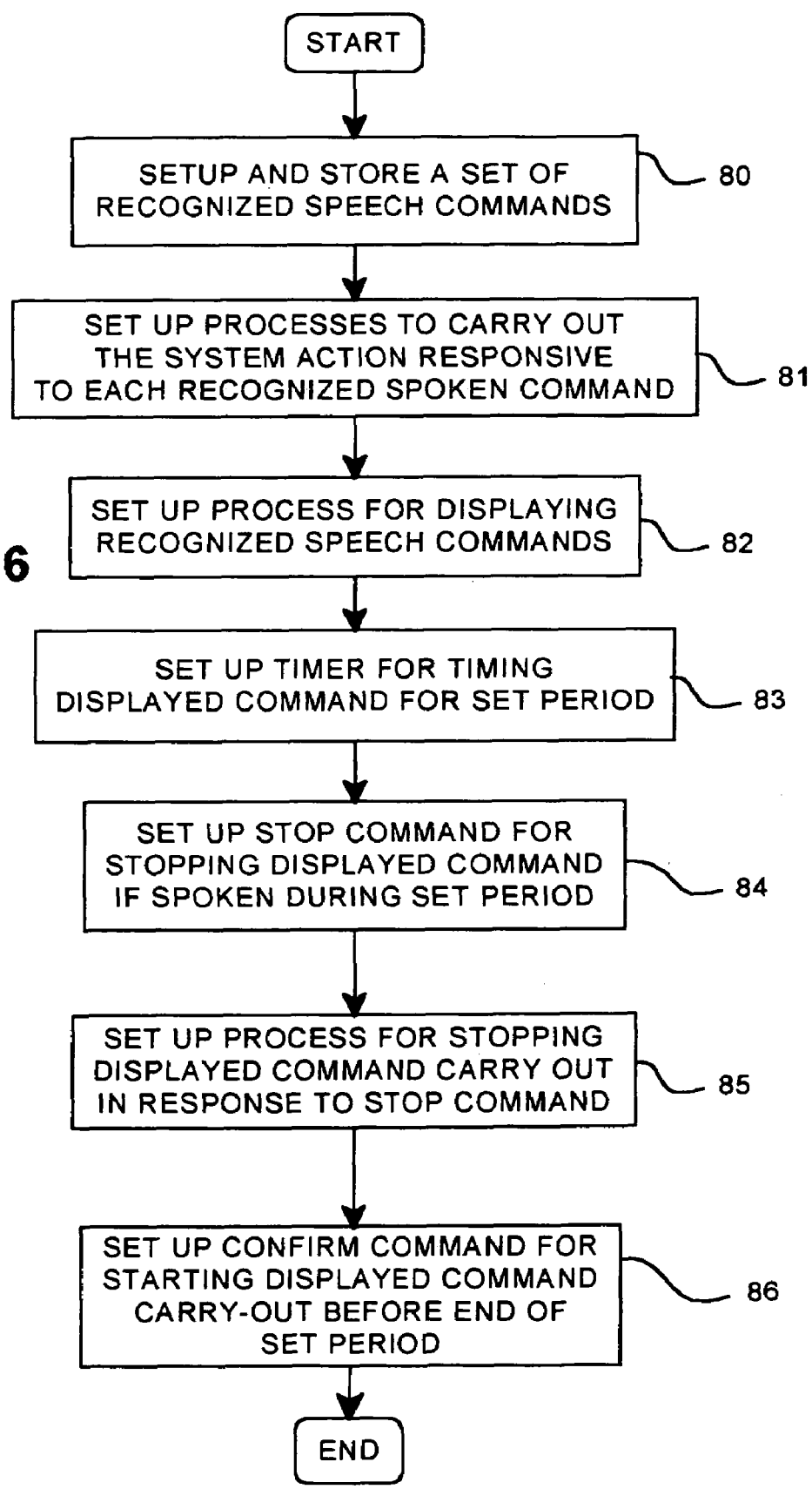
FIG. 6 is a flowchart of the basic elements of the system and program in a computer controlled display with visual feedback system of the present invention for enabling the spoken retraction of spoken commands.
Figure 7:
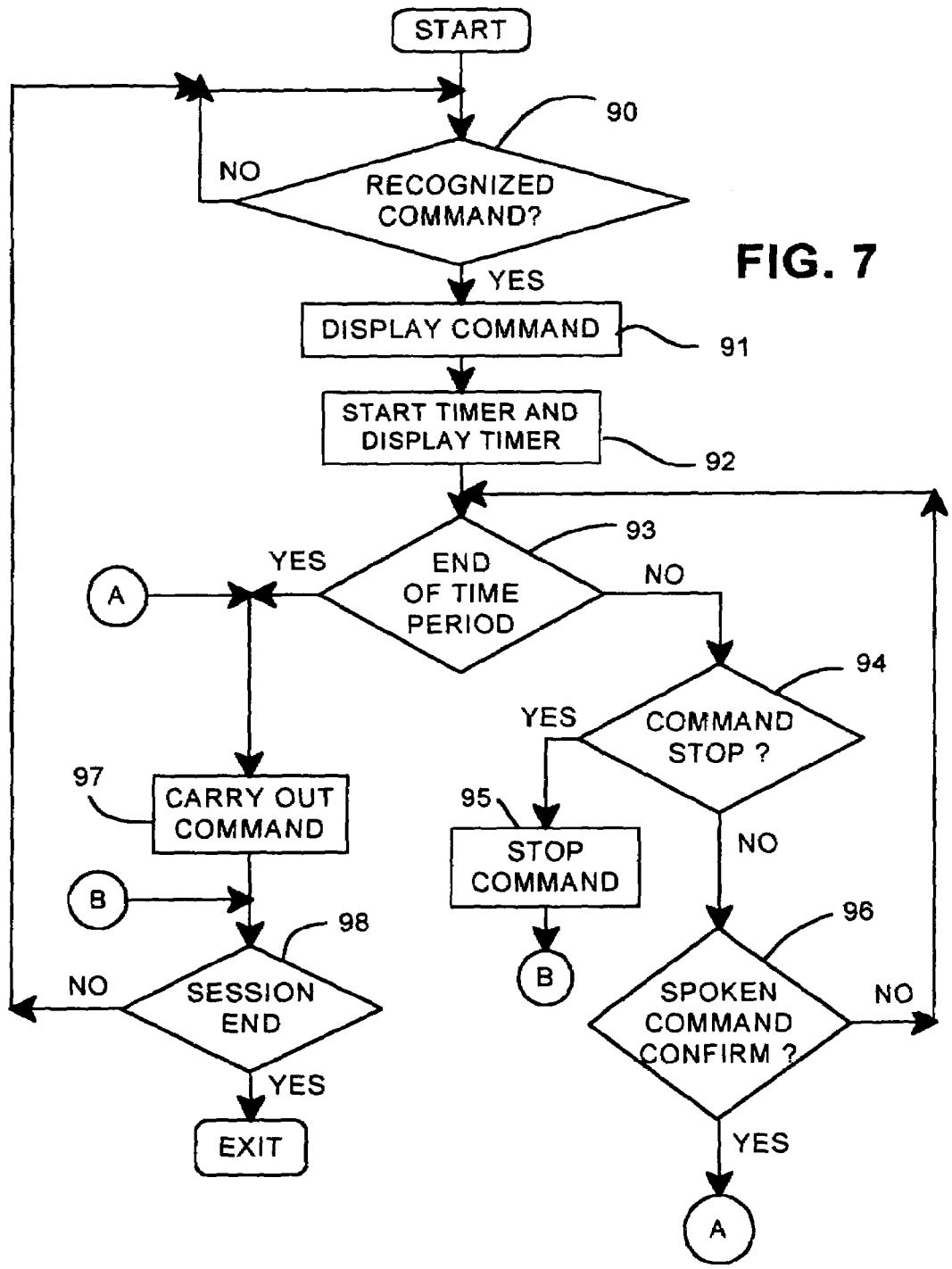
FIG. 7 is a flowchart of the steps involved in running the program set up in FIG. 6.

Now with reference to FIGS. 6 and 7 we will describe a process implemented by the present invention in conjunction with the flowcharts of these figures. FIG. 6 is a flowchart showing the development of a process according to the present invention for providing visual feedback to spoken commands so that the user has a time period or time delay in the command execution within which he may vocally confirm or cancel the command. First, step 80, a set of recognizable spoken commands, which will drive the system being used, is set up and stored. Then there are set up appropriate processes to carry out the action called for by each recognized speech command, step 81. A process for displaying recognized speech commands is also set up, step 82. A timer process for delaying the execution of the selected displayed command for a predetermined period is set up, step 83. A command is set up or enabled which may be spoken during the delay period to stop the execution of the selected command, step 84. A process is set for stopping the execution of the selected command responsive to the issuance of a stop command, step 85. Also, a process is set up whereby the user may issue a command to confirm the selected command during the time delay period, whereupon the selected command will immediately be executed, step 86.

With this set up, the running of the process will now be described with respect to FIG. 7. First, step 90, a determination is made as to whether there has been a command recognized by the system. If No, the process is returned to step 90 where such a command is awaited. If Yes, then the command is displayed, step 91, so that the user now has an opportunity to confirm the command during a period of time where the execution is delayed. This delay is timed by starting a timer, step 92, after which, decision step 93, a determination is made as to whether the time period of delay is over. If No, a further determination is made as to whether a stop command has been issued as yet, decision step 94. If Yes, the execution of the selected command is cancelled, step 95, and the process is branched via branch "B" to step 98 where a decision is made as to whether the session is over, in a manner to subsequently described. If the decision from step 94 is No, then the process proceeds to step 96 where a determination is made as to whether the user has spoken a confirmation of the selected command. If No, then the process returns to step 93 where the end of the time delay period is awaited. If the decision from step 96 is Yes, i.e. the user has spoken a confirmation of the selected command, or if the decision from step 93 is Yes, i.e. the time period of delay is over, then the process goes to step 97 and the selected command is executed. Then, step 98, a determination is made as to whether the session is over. If Yes, the session is exited. If No, the process is returned to step 90 where the next command is awaited.

One of the preferred implementations of the present invention is as an application program 40 made up of programming steps or instructions resident in RAM 14, FIG. 1, during computer operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In an interactive computer controlled display system with speech command input recognition, apparatus for confirming the recognition of a command comprising:
   means for predetermining a plurality of speech commands for respectively designating each of a corresponding plurality of system actions,
   means for detecting said speech commands,
   means responsive to a detected speech command for displaying said command for a predetermined time period,
   speech command means for stopping the system action designated by said displayed command, and
   means for executing the system action designated by said displayed command in the event that said system action is not stopped during said predetermined time period.

2. The system of claim 1 further including speech command means for executing the system action designated by said displayed command prior to the expiration of said time period.

3. The system of claim 2 wherein said speech command means for executing said system action prior to said time period expiration is responsive to a repetition of the detected speech command.

4. A method for confirming speech command input to an interactive computer controlled display system with speech command input recognition comprising:
   predetermining a plurality of speech commands for respectively designating each of a corresponding plurality of system actions,
   detecting said speech commands,
   responsive to a detected speech command, displaying said command for a predetermined time period,
   enabling a speech command for stopping the system action designated by said displayed command, and
   executing the system action designated by said displayed command in the event that said system action is not stopped by said enabled speech command during said predetermined time period.

5. The method of claim 4 further including an enabled speech command for executing the system action designated by said displayed command prior to the expiration of said time period.

6. The method of claim 5 wherein said speech command for executing said system action prior to said time period expiration is a repetition of the detected speech command.

7. A computer program having program code included on a computer readable medium for confirming speech command input recognition in an interactive computer controlled display system comprising:

means for predetermining a plurality of speech commands for respectively designating each of a corresponding plurality of system actions, means for detecting said speech commands, means responsive to a detected speech command for displaying said command for a predetermined time period, speech command means for stopping the system action designated by said displayed command, and means for executing the system action designated by said displayed command in the event that said system action is not stopped during said predetermined time period.

8. The computer program of claim 7 further including speech command means for executing the system action designated by said displayed command prior to the expiration of said time period.

9. The computer program of claim 2 wherein said speech command means for executing said system action prior to said time period expiration is responsive to a repetition of the detected speech command.

\* \* \* \* \*